Dec. 24, 1968    H. S. FISHER    3,418,140
METHOD OF MANUFACTURING CUPS
Filed Dec. 17, 1964    3 Sheets-Sheet 1

INVENTOR
HARLAND S. FISHER
BY John T. Stevens
AGENT

Dec. 24, 1968   H. S. FISHER   3,418,140
METHOD OF MANUFACTURING CUPS
Filed Dec. 17, 1964   3 Sheets-Sheet 2

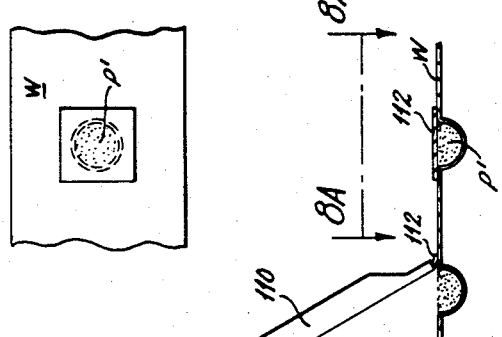
FIG. 8A
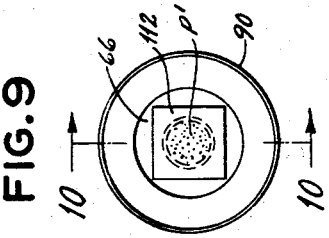
FIG. 9
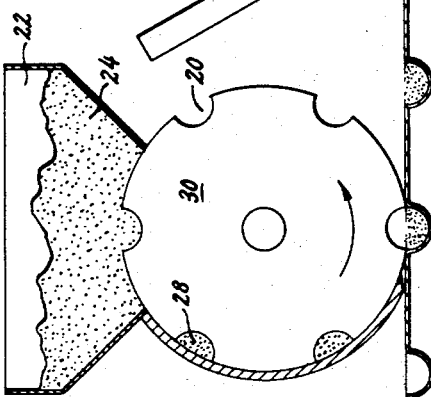
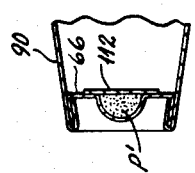
FIG. 10
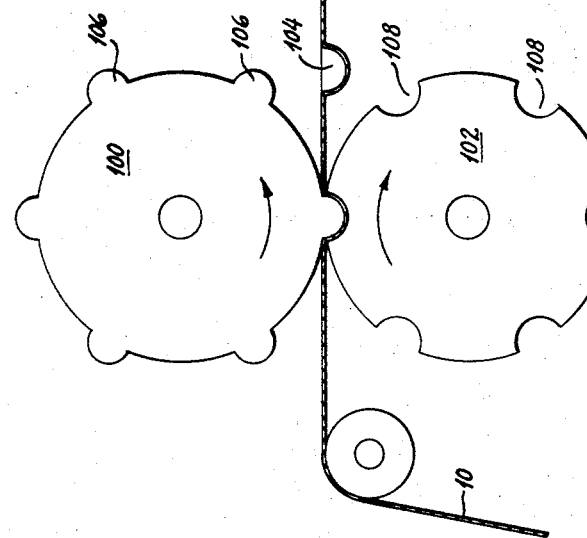
FIG. 8

United States Patent Office 3,418,140
Patented Dec. 24, 1968

3,418,140
METHOD OF MANUFACTURING CUPS
Harland S. Fisher, Longmeadow, Mass., assignor to
United States Envelope Company, Springfield, Mass.,
a corporation of Maine
Filed Dec. 17, 1964, Ser. No. 419,169
6 Claims. (Cl. 99—171)

ABSTRACT OF THE DISCLOSURE

Forming drinking cups containing a portion of soluble, edible material, by first depositing individual portions of such material at spaced points along a web of liquid-proof material, entrapping said edible material by securing a self-sustaining film of soluble, edible material thereto, severing the resultant composite web into blanks, each containing one portion of the soluble, edible material, with each blank being further shaped and joined with a sidewall forming blank to form a complete cup, the blank containing the soluble material forming the bottom of the cup.

---

This invention relates to the manufacture of two piece, disposable cups made of paper or like material, having contained therein a quantity of food concentrate, flavoring, or other edible material, hereinafter referred to as food concentrate, which dissolves or disintegrates in the liquid used in the cup by the consumer.

An object of this invention is to provide a simple and efficient method of making cups having a food concentrate containing compartment.

Another object of this invention is to provide a method of manufacturing disposable cups having a sealed compartment or "pouch" therein containing food concentrate which is fully protected against contamination with foreign material.

A further object of this invention is to provide a method of making disposable cups in which the sealed compartment or pouch is an integral part of one of the pieces of the cup.

Still another object of this invention is to provide a method of making pouch-containing cups in which speed of manufacturing cups on conventional types of cup making machines is not reduced.

Further objects will appear from the following description of the invention, and the novel features will be particularly pointed out hereinafter in connection with the appended claims.

According to this invention, the two-piece disposable cups are made by using as the bottom wall of the cups a piece of laminated material which entraps between the layers a portion of soluble food concentrate. As the bottom wall is oriented in relation to the completed cup, the outer layer thereof is of a liquid-proof material and the inner layer is preferably of a soluble, edible material.

Also, according to my invention, the bottom wall is made by intermittently advancing a web of the laminated material with the portions of food concentrate entrapped at spaced apart intervals between the layers, and during stop periods, removing interior sections of the web, the removed sections containing at an interior position the pouches or compartments of food concentrate. The sections are removed by a cutting or punching mechanism, then they are formed or shaped to the correct configuration for uniting with the side wall, and finally they are placed in position for combining with the side wall, preferably with a single, straight-line manipulation of the removed section.

The cups manufactured in accordance with the method of this invention are useful because the food concentrate or other edible material has been placed in the cup for the consumer. Normally, where a drink of instant coffee, cocoa, or the like is desired, it must first be obtained from a remote source, measured, and then put in the cup before filling with liquid. In the case of the cup manufactured by the method of this invention, the measured quantity of material is already in the cup. Cups having a premeasured amount of such material in the bottom, with a removable false bottom, are already known in this art. Such cups, however, must be loaded with the food concentrate after the cup bottom and side wall have been united. Moreover, the false bottom must be inserted in a subsequent operation.

The present invention provides a method of making cups in which the food concentrate-containing pouch is an integral part of the bottom of the cup, thus eliminating the insertion of food concentrate and false bottom into the finished cup. Moreover, since the invention contemplates the use of a layer of soluble, edible material as the inner covering for the pouch, this layer dissolves when liquid is added; thus no false bottom need be removed or punctured.

In the drawings:

FIGURE 1A is a plan view of a portion of the web of laminated material.

FIGURE 1B is a view of the web of laminated material after the cup bottom sections have been removed.

Figure 1:
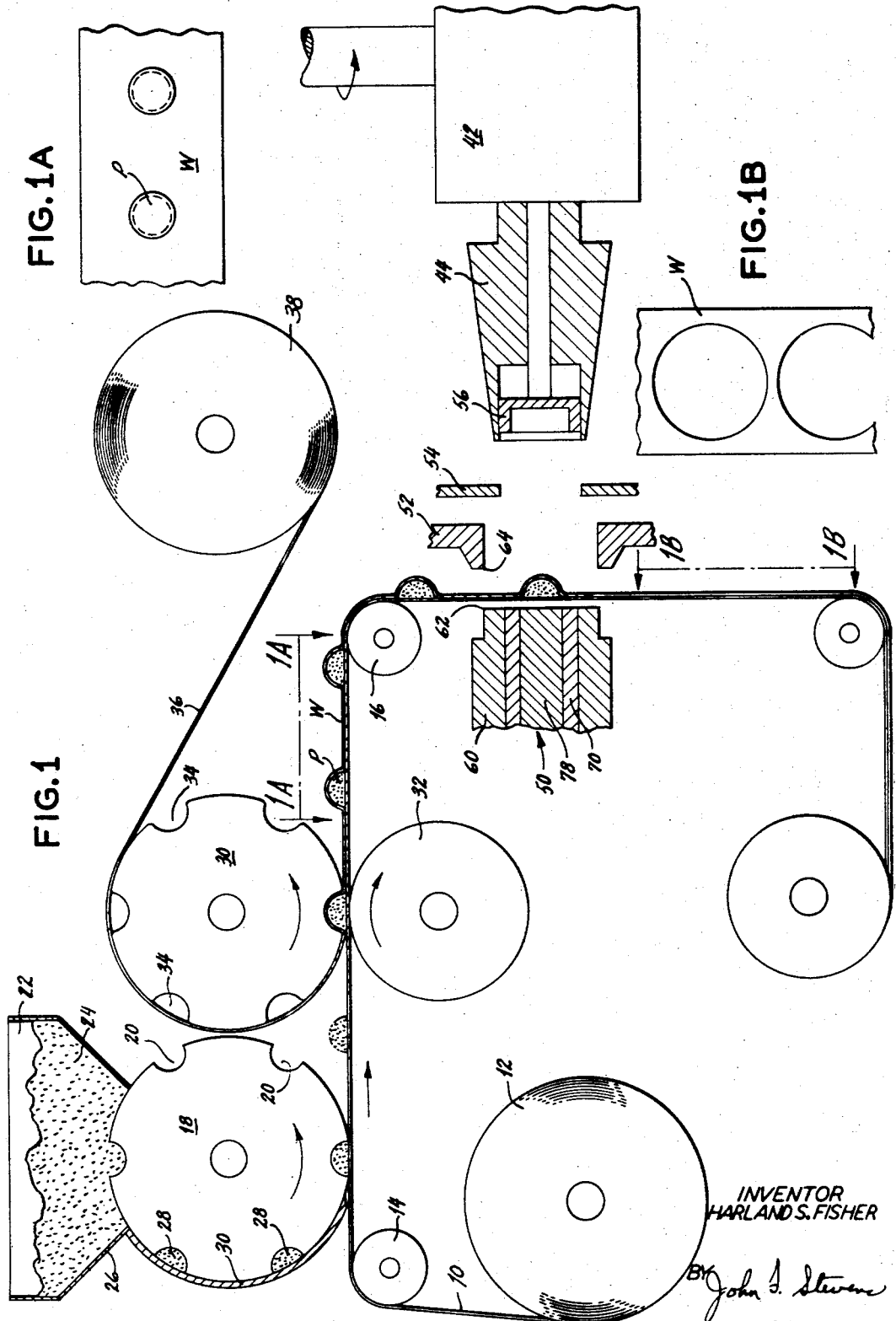
FIGURE 1 illustrates diagrammatically one embodiment for carrying out the method of this invention.
Figure 2:
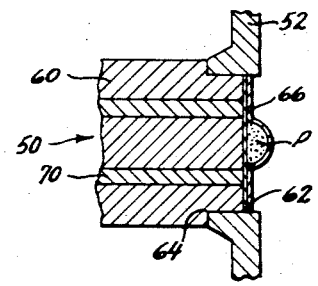
Figure 3:
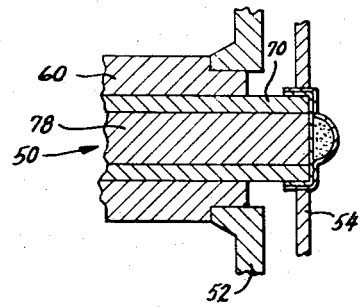
Figure 4:
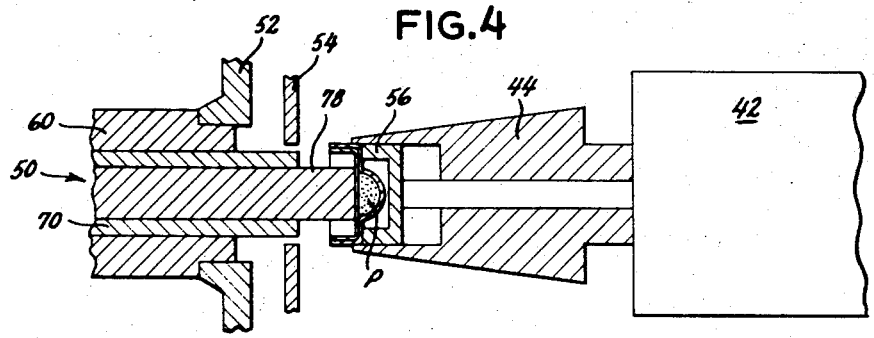

FIGURES 2-4 inclusive are schematic views illustrating the manner in which sections are removed from the laminated web and inserted into the end of a cup-forming mandrel.

Figure 5:
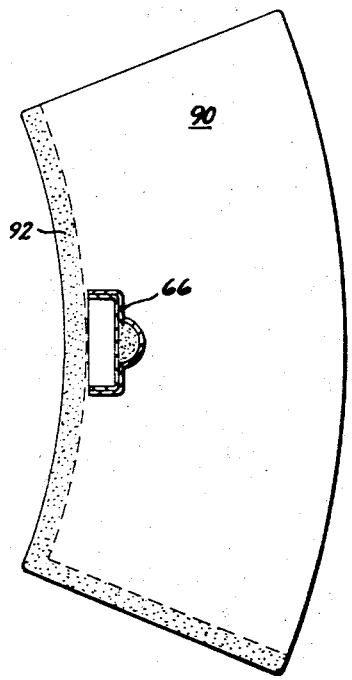
Figure 6:
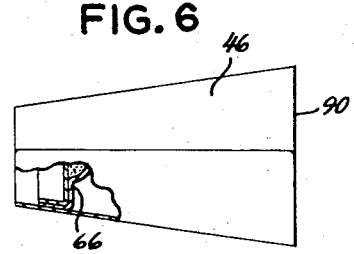
Figure 7:
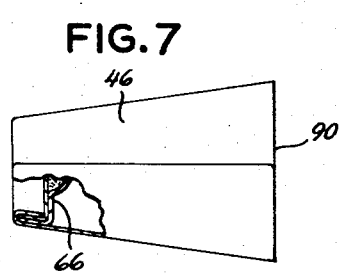

FIGURES 5-7 inclusive are schematic views illustrating the sequence of forming the cups.

FIGURE 8 illustrates diagrammatically another embodiment of this invention.

FIGURE 8A is a plan view of a portion of the web shown in FIGURE 8.

FIGURE 9 is a plan view of a cup formed from bottoms made according to the method illustrated in FIGURE 8.

FIGURE 10 is a partial section view taken along line 10—10 of FIGURE 9.

Referring to the drawings, the web 10 of liquid-proof container wall material is unwound from the roll 12 and passed over roll 14, and then is moved in a path, which in this instance, is horizontal. Means not shown are provided below the web 10 for adequately supporting it between roll 14 at the beginning of its horizontal path, and roll 16 at the end of its horizontal path. The web 10 is preferably paper of a weight normally used in making disposable cups, but it could, of course, be of a different kind of material such as plastic, foil, or the like.

Near the beginning of its path of horizontal travel, the web 10 passes beneath the metering roll 18 which is provided with a series of circumferential serrations 20. Just above the metering roll 18 and in communication therewith by means of its open bottom, is a hopper 22 containing food concentrate 24. As the metering roll 18 rotates in communication with the interior of the hopper, the food concentrate fills the serrations 20, in quantities determined by the size of the serrations 20 and by the doctor blade 26. The portions 28 of food concentrate received in the serrations 20 are retained therein by means of a curved baffle plate 30 or the like until they come substantially in contact with the web 10. Then by gravity or by positive ejection means (not shown) the portions 28 are deposited in small, spaced apart piles on the upper side of the web 10. The web 10, and the spaced apart portions 28 continue to travel through a fabricating roll 30 and backing drum 32. The fabricating roll 30 also is provided with circumferential serrations 34, and rotates in timed relation with the metering roll 18. The circumferential serrations of fabricating roll 30 are angularly spaced such that the portions 28 of edible material on the web 10 will be received into the serrations as the roll 30 rotates. It is preferred that the serrations 34 be slightly larger than the portions 28 on the web so that the portions 28 will not be scattered.

At the fabricating roll 30, a web 36 of material from roll 38 is fed into face to face contact with the web 10 and laminated therewith, completely sealing off and entrapping the portions 28 into compartments, or pouches P. The webs 10 and 36 may be laminated by suitable adhesive, or by heat sealing.

Also, instead of laminating a pre-formed web with the web 10, suitable extrusion apparatus may be provided to extrude a film onto the web 10, substantially at the position of the fabricating roll 30, thereby entrapping the portions 28 between the web 10 and the extruded film, as will be explained hereinafter. Preferably the web 36, whether pre-formed or extruded at the position of the fabricating roll 30, is of a soluble, edible material, e.g., corn starch polyvinyl alcohol, carboxy methyl cellulose, methylcellulose or the like. For simplicity, the webs 10 and 36 illustrated in the drawings may be assumed to be laminated by the application of heating means (not shown) to backing drum 32, thereby causing the web 36 to adhere to the web 19 of container wall material when the webs are brought together in face to face contact between fabricating roll 30 and backing drum 32. However, if the nature of the webs 10 and 36 do not lend themselves to lamination by heat, suitable gumming mechanism (not shown) may, of course, be utilized to apply coatings of adhesive to desired areas of web 36 before it is united with web 10. Such gumming mechanisms are well known in the art.

For convenience, the laminated web W changes direction over roll 16 from a horizontal path to a vertical path. This change of direction has not been found to be necessary; however, such a change ties in very nicely with the turret 42 mounted for rotation about a vertical axis. The mandrel-carrying turret 42 is a conventional type of intermittently operating turret in which radial, angularly spaced mandrels 44 are successively stopped at angularly spaced working stations. The first step in the operation of the turret is to pick up a bottom piece for a cup in the end of a mandrel. At succeeding stations, the side wall piece of the cup is wrapped around the mandrel, and the bottom and side wall pieces are joined and crimped. Cups at this stage are then transferred to a second turret for curling the top rim, and finally stacked in a nested condition.

In the method according to this invention, only the first station on the turret 42, i.e., the bottom piece insertion, is pertinent. The succeeding steps of forming the cup 46 are illustrated in FIGURES 5–7 inclusive, and may be carried out on conventional cup machines. The finished, laminated web W, with the portions of food concentrate 28 entrapped in spaced apart pouches P, is preferably advanced intermittently. During stops, a combination tool denoted generally at 50 works in combination with the cutting die 52 and the forming die 54 to remove an interior section from the laminated web W including the food concentrate filled pouch P which has been brought substantially into adjacent alignment therewith, shape the removed section, and insert it into the bottom of the mandrel 44, which has also been momentarily stopped and locked in place against the cup-shaped element 56.

The tool 50 is actually a reciprocating tool which is located beside the path of the web. During the time the web and turret are stopped, the tool 50 advances in a perpendicular direction to the web. The outer section 60 of the tool 50 includes a substantially circular cutting edge 62, which, in conjunction with the cutting edge 64 of the die 52, removes a generally circular section 66 from the laminated web W, as best illustrated in FIGURE 2.

Upon removal of the section 66 from the web, the second stage of the tool 50 goes into action. A substantially circular forming or shaping element 70, slideable in the outer section 60, continues to travel in the same direction, perpendicular to the web, and pushes the removed section 66 through the stationary forming or shaping die 54, thereby folding the edges of the removed section 66 substantially 90°, making a shallow cup out of the removed section 66. At this point, the shaping element 70 stops, but the inserting element 78, slideable within the shaping element 70, continues to move in the same direction, and places the removed section 66 into the end of the mandrel 44 with the pouch P of food concentrate fitting into the cup-shaped element 56. It may be desirable from an operating standpoint to provide means (not shown) for supplying suction to the end of the inserting element 78 to insure that the removed section will remain in place during the entire operation, i.e., from the time it is removed from the web, until it is inserted in the mandrel 44.

Upon insertion of the removed section 66 into the mandrel 44, the elements of tool 50 retracted to their original positions, as shown in full lines in FIGURE 2. At this point, the laminated web W advances to the next pouch P, and simultaneously therewith the turret 42 advances the next mandrel 44 into position in alignment with tool 50. At this point, the above described operation is repeated.

The waste portions of the laminated web, after the pouch sections have been removed therefrom, are carried over the roll 84, and finally wound onto roll 86 for disposal.

FIGURES 5–7 inclusive illustrate the various conventional stages of forming two piece cups 46. In FIGURE 5, the side wall blank 90 and the bottom piece 66 are held substantially in the position shown at the first stage of manufacture. Notice that the blank 90 has been coated in edge areas with the adhesive 92. In FIGURE 6, the side wall blank 90 has been wrapped into a truncated conical shape surrounding the bottom piece 66 at its smaller end. In FIGURE 7, the side wall and bottom have been joined by turning the small end of the side wall over the flange of the bottom piece 66.

Another method of forming the food concentrate-containing pouches is illustrated in FIGURE 8. Here, the web 10 is passed between the rolls 100 and 102 to produce the cavities 104 in the web 10 by means of the mating protrusions 106 in roll 100 and cavities 108 in roll 102. The metering roll 30 rotates in time with the cavities 104 of web 10 so as to deposit portions of the food concentrates 24 in the cavities 104 as they pass under roll 30. Just beyond the metering roll 30, there is located an extruder 110 for extruding patches 112 of material, which, as stated hereinbefore are preferably soluble and edible. The extruder 110 also operates in time with the passage of the food concentrate-containing cavities 104 just beneath it to apply patches 112 over the cavities 104, thereby sealing the food concentrate in the pouches P'. Sections of the web W are then removed as explained above and applied as the bottom wall of a disposable cup. In this embodiment of the invention, obviously only spaced apart sections of the web W are laminated.

The cups manufactured according to the embodiment of the invention illustrated in FIGURE 8 are shown in FIGURES 9 and 10. Note particularly that in this case, the edges of the patch 112 are completely exposed to the inside of the cup, and do not extend down between the flange of the bottom section 66 and the side wall of the cup. This structure eliminates any possibility of the bottom section 66 loosening or leaking due to possible dissolving of the thin layer or patch 112 between the bottom section 66 and the side wall.

It will be understood that various changes in the details, materials, steps, and arrangements of parts, which have been herein described and illustrated in order to explain

I claim:
1. The method of forming a two-piece disposable drinking cup which comprises the steps of:
   (a) advancing a web of liquid-proof container wall material along a path,
   (b) depositing portions of edible material at spaced-apart intervals on the advancing liquid-proof web,
   (c) covering each deposited portion of edible material with a self-sustaining film of soluble, edible material, and adhering said film to said web of liquid-proof container wall material around the edge of each deposited portion to entrap the portion in a cavity between said web and said film,
   (d) severing the resultant web between the portions of entrapped material,
   (e) shaping the severed pieces to a predetermined configuration, and
   (f) applying each shaped piece as a bottom restraining wall to a drinking cup with the side formed of soluble, edible material turned innermost.

2. The method of forming a two-piece disposable drinking cup as defined in claim 1 further characterized by:
   (a) said film of soluble, edible material being a continuous web of such material and said step of covering each deposited portion of edible material with said film and of adhering said film to said web of liquid-proof container wall material consisting of aligning said web of soluble, edible material with said web of liquid-proof material so as to bring said two webs into face to face contact and adhering the two contacting faces of said webs to one another,
   (b) said step of shaping the severed pieces to a predetermined configuration consisting of shaping each severed piece to provide a generally circular portion surrounded by a generally cylindrical flange, with said web of soluble, edible material being on the radially outwardly directed face of said flange, and
   (c) said step of applying each shaped piece as a bottom restraining wall to a drinking cup consisting of surrounding each of said shaped pieces with a sidewall forming blank, in-turning one edge of said sidewall forming blank around the flange of the associated shaped piece, and adhering the in-turned portion of said sidewall forming blank to the radially inwardly directed flange of said shaped piece.

3. The method of forming a two-piece disposable drinking cup as defined in claim 1 further characterized by:
   (a) pre-forming said web of liquid-proof wall material to provide spaced pockets into which said deposited portions of edible material are placed,
   (b) said step of covering each deposited portion of edible material with a self-sustaining film of soluble, edible material, consisting of applying an individual patch of said film over each of said pockets containing portions of edible material and adhering each of said patches to said web of liquid-proof container wall material around the edge of its associated pocket,
   (c) said step of severing the resultant web between the portions of entrapped material consisting of severing said web at each pocket about a circular line surrounding and spaced substantially from the patch covering the pocket,
   (d) said step of shaping the severed pieces to a predetermined configuration consisting of bending the marginal edge of each of said pieces to provide a circular portion containing entirely the associated patch and to provide a generally cylindrical flange having a radially outwardly directed surface continuous with the surface of said circular portion to which the associated patch is adhered, and
   (e) said step of applying each shaped piece as a bottom restraining wall to a drinking cup consisting of surrounding each of said pieces with a sidewall forming blank, inturning one edge of said sidewall forming blank around said flange of the associated shaped piece, and adhering said in-turned edge of the sidewall forming blank to the radially inwardly directed face of said flange.

4. The method of forming a two piece, disposable drinking cup which comprises the steps of:
   (a) enclosing portions of edible material at spaced-apart intervals between a web a liquid-proof container material, and web of soluble, edible material,
   (b) uniting said webs around the enclosed portions of edible material to entrap said portions in cavities between the webs,
   (c) severing the resultant laminated web between the portions,
   (d) shaping the severed pieces to a predetermined configuration, and
   (e) applying the shaped pieces as a bottom restraining wall to a drinking cup with the side formed of soluble, edible material turned innermost.

5. The method of forming a two piece, disposable drinking cup with comprises the steps of:
   (a) advancing a web of liquid-proof container wall material along a path,
   (b) depositing portions of edible material at spaced-apart intervals on the advancing liquid-proof web,
   (c) laminating and sealing the liquid-proof web with a web of soluble, edible material, thereby entrapping the portions in cavities between the webs,
   (d) removing sections from within the boundaries of the laminated web which contain the entrapped edible material,
   (e) shaping the removed portions to a predetermined configuration, and
   (f) applying the shaped pieces as a bottom restraining wall of a drinking cup with the side formed of soluble, edible material turned innermost.

6. The method of forming a two-piece, disposable drinking cup which comprises the steps of:
   (a) intermittently advancing a laminated web containing a layer of liquid-proof container material and a layer of soluble, edible material having interposed therebetween at spaced apart intervals portions of edible material,
   (b) severing the resultant web between the portions of entrapped material,
   (c) shaping the severed pieces to a predetermined configuration, and
   (d) applying each shaped piece as a bottom restraining wall to a drinking cup with the side formed of soluble, edible material turned innermost.

References Cited

UNITED STATES PATENTS

| | | | |
|---|---|---|---|
| 2,062,897 | 12/1936 | Michel et al. | 206—47 |
| 2,266,948 | 12/1941 | Barbieri | 229—4.5 X |
| 3,184,895 | 5/1965 | O'Connor | 53—28 |

RAYMOND N. JONES, *Primary Examiner.*

S. DAVIS, *Assistant Examiner.*

U.S. Cl. X.R.

99—78; 53—30, 184; 206—47; 229—1.5